United States Patent
Bartolomeo

(10) Patent No.: US 11,746,877 B2
(45) Date of Patent: Sep. 5, 2023

(54) HIGH STRENGTH VIBRATION DAMPING COMPONENTS

(71) Applicant: Rolls-Royce Corporation, Indianapolis, IN (US)

(72) Inventor: Mark E. Bartolomeo, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 699 days.

(21) Appl. No.: 16/710,855

(22) Filed: Dec. 11, 2019

(65) Prior Publication Data
US 2021/0180675 A1    Jun. 17, 2021

(51) Int. Cl.
| | |
|---|---|
| *F16H 55/14* | (2006.01) |
| *F16H 55/17* | (2006.01) |
| *B33Y 80/00* | (2015.01) |
| *B33Y 70/00* | (2020.01) |
| *C25D 5/12* | (2006.01) |
| *C25D 3/56* | (2006.01) |
| *C25D 5/18* | (2006.01) |
| *C25D 7/00* | (2006.01) |
| *B33Y 40/20* | (2020.01) |
| *B33Y 10/00* | (2015.01) |

(52) U.S. Cl.
CPC .............. *F16H 55/14* (2013.01); *B33Y 40/20* (2020.01); *B33Y 70/00* (2014.12); *B33Y 80/00* (2014.12); *C25D 3/562* (2013.01); *C25D 5/12* (2013.01); *C25D 5/18* (2013.01); *C25D 7/00* (2013.01); *F16H 55/17* (2013.01); *B33Y 10/00* (2014.12)

(58) Field of Classification Search
CPC ............. F16H 55/18; F16H 2057/0012; F16H 57/0006; F16H 55/06; F16H 55/16; F16H 55/14; F16H 55/17; B33Y 70/00; B33Y 80/00
See application file for complete search history.

(56) References Cited

U.S. PATENT DOCUMENTS

| | | | | |
|---|---|---|---|---|
| 4,681,152 A | * | 7/1987 | Flowers | B22D 11/0642 75/412 |
| 6,406,611 B1 | * | 6/2002 | Engelhaupt | C25D 3/562 205/255 |
| 9,719,353 B2 | * | 8/2017 | Bolcavage | C23C 28/023 |
| 9,970,297 B2 | * | 5/2018 | Vest | F01D 25/005 |
| 2006/0160636 A1 | | 7/2006 | Palumbo et al. | |
| 2009/0152042 A1 | * | 6/2009 | Pierick | B62K 19/16 180/311 |
| 2019/0210635 A1 | * | 7/2019 | Sato | C23C 14/0611 |
| 2020/0025278 A1 | * | 1/2020 | Lundbäck | F16H 3/78 |
| 2021/0062906 A1 | * | 3/2021 | Mauerlechner | F16H 55/12 |

* cited by examiner

*Primary Examiner* — Gregory Robert Weber
(74) *Attorney, Agent, or Firm* — Shumaker & Sieffert, P.A.

(57) ABSTRACT

A mechanical component that includes a core substrate and a nano-crystalline coating on at least a portion of the core substrate. The core substrate defines a resonance damping cavity. The resonance damping cavity is configured to damp a vibration in the component at a selected frequency.

17 Claims, 7 Drawing Sheets

US 11,746,877 B2

HIGH STRENGTH VIBRATION DAMPING COMPONENTS

TECHNICAL FIELD

The present disclosure relates techniques for forming mechanical components, such as aerospace components.

BACKGROUND

Mechanical components may expose to a variety of stresses or other factors during operation, such as, for example, bending forces, compression forces, shear forces, tensile forces, thermal cycling stress, vibration, erosion, and corrosion, and the like. The exposure of the mechanical components to the variety of stresses and other factors may impact the lifespan of the component, such as leading to early fatigue or failure. In some examples, mechanical components have been developed that exhibit higher strength and durability using high density metals or metal alloys. However, some high-density metals or metal alloys may be relatively heavy, difficult to manufacture, and expensive making their use non-ideal for some applications.

SUMMARY

In some examples, the disclosure describes a mechanical component that includes a core substrate and a nano-crystalline coating on at least a portion of the core substrate. The core substrate defines a resonance damping cavity. The resonance damping cavity is configured to damp a vibration in the component at a selected frequency or range of frequencies.

In some examples, the disclosure describes a gear that includes a core substrate and a nano-crystalline coating on at least a portion of the core substrate. The core substrate is formed in the shape of the gear. The gear includes a body and gear teeth extending from the body. A portion of the body adjacent the gear teeth defines a resonance damping cavity configured to damp a vibration in the gear at a selected frequency or range of frequencies.

In some examples, the disclosure describes a method for forming an aerospace mechanical component that includes forming a core substrate defining a resonance damping cavity, the resonance damping cavity configured to damp a vibration in the component at a selected frequency or range of frequencies, and depositing a nano-crystalline coating on at least a portion of the core substrate.

The details of one or more examples are set forth in the accompanying drawings and the description below. Other features, objects, and advantages will be apparent from the description and drawings, and from the claims.

DETAILED DESCRIPTION

In general, the disclosure describes components and techniques for making components that include a core substrate defining a resonance damping cavity and a nano-crystalline material applied to at least a portion of the core substrate. The techniques described herein may be used to form, via additive manufacturing methods such as three-dimensional printing, components that exhibit improved strength and reduced weight characteristics compared to conventional metal components. Additionally, or alternatively, the described techniques may be used to form components with improved noise and vibrational damping characteristics which may result in an increased service life for the component. In some examples, the components may be constructed such that the resonance damping cavity is shaped and/or is filled with a vibration damping material to damp a vibration in the component at a selected frequency or frequency range (e.g., frequencies to which the component is exposed during operation).

In some examples, a design of the component formed by additive manufacturing, such as by three-dimensional printing, may be topologically optimized. Constrains of the topological optimization may include, for example, reduced weight, reduced cost, substantially similar safety margins, substantially similar bending strength, substantially similar impact strength, substantially similar compressive or pitting strength, and substantially similar scoring resistance, compared to a similar component formed by other techniques or other materials. Additionally, or alternatively, forming the component using additive manufacturing may enable forming the resonance damping cavity to have a selected shape (e.g., tuned) to damp a vibration in the component at a selected frequency or frequency range. Additionally, or alternatively, forming the component using additive manufacturing may enable forming structures, such as webs or slots, configured to reduce the weight and/or material cost of the component.

In some examples, the component may include a gear, such as a spur gear. The gear may include a core material defining a web extending from an inner rim to an outer rim with radially protruding gear teeth. The gear may be three-dimensionally printed from any suitable material. In some examples, the material may include light weight, moderately inexpensive, high performance metallic alloys, such as, for example, titanium, aluminum, or alloys thereof. In other examples, the material may include one or more plastics or one or more performance ceramic metallics. In the example of a gear, the resonance damping cavity may include an annular hollow chamber within the outer rim a selected distance from the gear teeth.

Figure 1A:
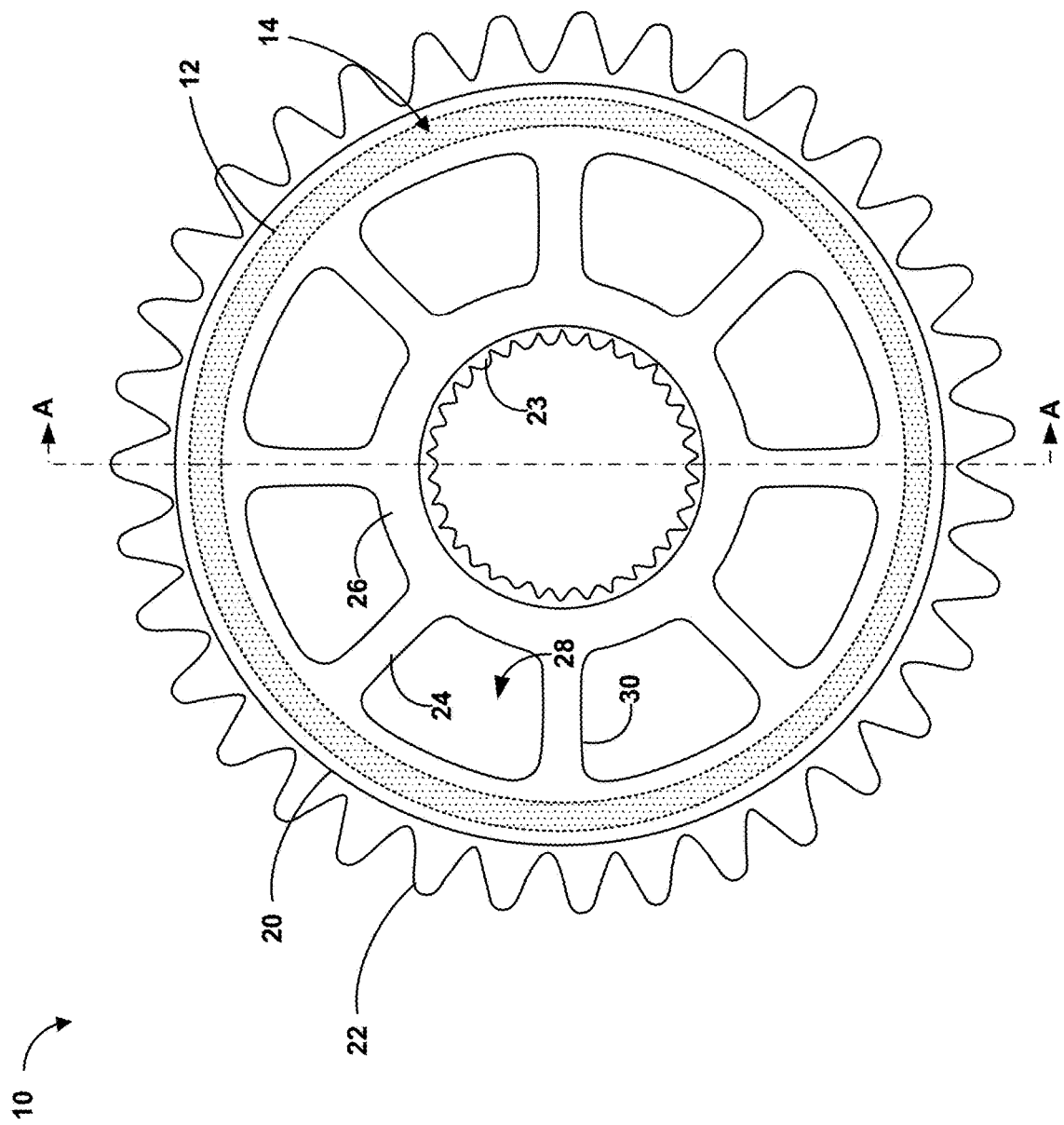
FIG. 1A is a conceptual plan view of an example component defining a resonance damping cavity.
Figure 1B:
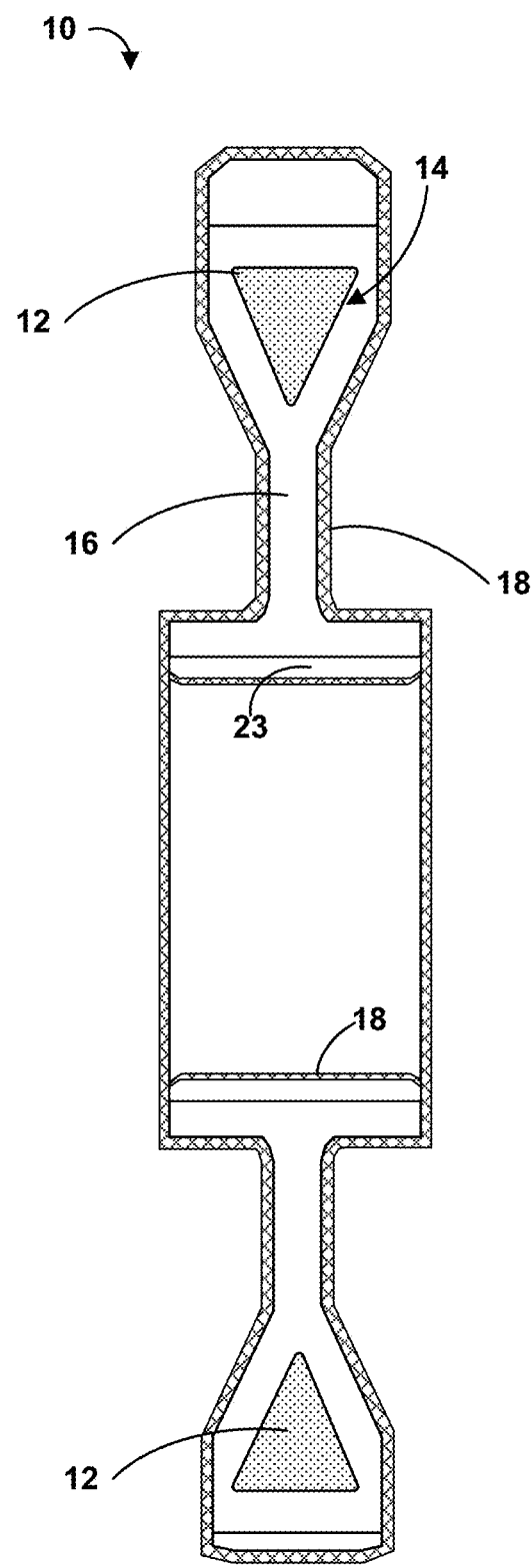
FIG. 1B is a conceptual partial cross-sectional view of the example component, along line A-A as indicated in FIG. 1A, that illustrates the core substrate and the nano-crystalline coating of the component.

FIG. 1A is a conceptual plan view of an example component 10 defining a resonance damping cavity 12 ("cavity 12"). In some examples, cavity 12 may be partially or completely filled with a vibration damping material 14. Component 10 is formed from a core substrate 16 that is coated with a nano-crystalline coating 18. FIG. 1B is a conceptual partial cross-sectional view of component 10, along line A-A as indicated in FIG. 1A, that reveals core substrate 16 and nano-crystalline coating 18.

In some examples, the conditions in which component 10 is typically operated (e.g., mechanical system applications) may exert forces on component 10 that cause component 10 to vibrate. Depending on the structure and natural resonance frequency of component 10, the applied forces may be similar to the natural resonance frequency of component 10, thereby causing component 10 to resonate. The resonance of component 10 may lead to increased noise and, over an extended period of time, may cause early fatigue of component 10. The applied forces are a particular concern for aerospace components, such as turbine engine components, accessory gearbox components, gears, driveshafts, or the like. In such instances, it may be desirable for component 10 to possess a natural resonance frequency outside the range of operational frequencies or otherwise damp the vibrational frequencies anticipated to be experienced by the component during operation.

Cavity 12 is configured to damp a vibration in component 10 at a selected frequency or frequency range (e.g., the vibrational frequencies experienced by on component 10 during operation). For example, cavity 12 may inhibit, slow, or otherwise disrupt vibrational waves traveling through component 10 in such a way so as to alter a natural resonance frequency of component 10. In some examples, a shape and/or a position of cavity 12 may be selected to damp a vibration at the selected frequency or frequency range. In some examples, the selected frequency or range of frequencies may be within a range from about 50 Hz to about 50,000 Hz, such as about 500 Hz to about 5,000 Hz. In examples in which component 10 includes a gear, cavity 12 may include an annular cavity positioned within a body of the gear. For example, the body of the gear may include outer rim 20, web 24, and inner rim 26. Inner rim 26 may include spline teeth 23. Spline teeth 23 may be configured to mechanically couple component 10 to another mechanical component, such as a driveshaft or the like. Outer rim 20 may include teeth 22 and define cavity 12. In some examples, a position of cavity 12 closer to teeth 22 may improve vibration damping relative to a cavity positioned farther from teeth 22. A position of cavity 12 may be determined based on a selected mechanical strength of a root 21, e.g., where teeth 22 meet rim 20, and a selected quantity of vibration damping.

In some examples, cavities 12 may be filled with a vibration damping material 14. Vibration damping material 14 may absorb or otherwise dissipate at least a portion of the energy of vibrational waves traveling through component 10 in such a way so as to alter a natural resonance frequency of component 10. Vibration damping material may include any material or combination of materials suitable to disrupt vibration travelling from teeth 22, through web 24, toward inner rim 24. For example, vibration damping material may include a material that is different than a material of core substrate 12. In some examples, the vibration damping material may include a polymer, rubber, polyurethane, polyvinyl chloride, or a metal or alloy. In some examples, the vibration damping material may include a material having a selected damping coefficient.

Core substrate 16 may include any suitable material. The material of core substrate 16 may be selected based on selected mechanical properties of the material, such as modulus of elasticity, tensile strength, elongation, hardness, and fatigue limit. In some examples, core substrate 16 may include a metal, such as, for example, aluminum, titanium, alloys thereof, one or more metals suitable for three-dimensional printing, or the like. In some examples, core substrate may include a polymeric material, such as, for example, polyether ether ketone (PEEK), polyamide (PA), polyimide (PI), bis-maleimide (BMI), epoxy, phenolic polymers (e.g., polystyrene), polyesters, polyurethanes, silicone rubbers, nylons, copolymers, polymeric blends, one or more polymers suitable for three-dimensional printing, or the like. In some examples, the polymeric material may be combined with one or more optional additives including, for example, binders, hardeners, plasticizers, antioxidants, and the like. In some examples, core substrate 12 may include a combination of two or more materials, such as a polymeric material and a metal or alloy.

In examples in which core substrate includes a polymeric material, core substrate 16 may also include one or more reinforcement fibers or reinforcing materials such as, for example, carbon fibers, carbon nano-tubes, and the like embedded in the polymeric material. The reinforcement fibers or reinforcing materials may increase the relative strength of polymeric material, thereby increasing the strength of the resultant core substrate 16. In some examples, core substrate 16 may include between about 10% to about 40% reinforcement fibers/materials (e.g., carbon fibers) mixed with polymeric material and the one or more optional additives. In other examples, core substrate 16 may consist essentially of polymeric material.

Core substrate 16 may be formed using any suitable additive manufacturing technique. In addition, the technique may include one or more processing steps, such as, for example, machining holes in cavity 12 to subsequently inject liquid (e.g., melted, molten, or otherwise flowable) vibrational damping material 14 into cavity 12. In some examples, the one or more processing steps may include machining one or more portions of component 10 to define a final shape of component 10. For example, machining may include removing material to define at least a portion of web 24, such as windows 28 of framed by trusses 30 of web 26. In some examples, web 24 of core substrate 16 in conjunction with nano-crystalline coating 18 may allow for significant weight reduction of component 10 without significantly reducing the strength and durability properties of component 10.

Nano-crystalline coating 18 of component 10 may include one or more layers of metals or metal alloys that defines an ultra-fine-grained microstructure with an average grain size less than about 50 nanometers (nm), such as less than about 20 nm or less than about 5 nm. Nano-crystalline coating 18 may be disposed on a surface of substrate 16, such as, for example, on a surface of substrate 16 defining one or more of outer rim 20, teeth 22, spline teeth 23, web 24, and/or inner rim 26. In some examples, the reduced grain size of nano-crystalline coating 18 may increase the relative tensile strength of the resultant layer as well as the overall hardness of the layer. In this way, nano-crystalline coating 18 may be significantly stronger and more durable compared to a conventional metallic coating (e.g., coarse grain coating) of the same composition and thickness. In some examples, the increased strength and hardness of nano-crystalline coating 18 may allow for the layer to remain relatively thin (e.g., between about 0.025 millimeters (mm) and about 0.15 mm) without sacrificing the desired strength and hardness characteristics of the layer. Additionally, or alternatively, depositing a relatively thin layer of nano-crystalline coating 18 on core substrate 16 may help reduce the overall weight of component 10 by reducing the volume of denser metals or metal alloys. The combination of the relatively light weight core substrate 16 and nano-crystalline coating 18 may result in a relatively high strength, relatively low weight component ideal for aerospace applications. In some examples, reducing an amount of metal used to form component 10 and/or increasing sizes of windows 28 may improve stealth capabilities of component 10.

Nano-crystalline coating 18 may include one or more pure metals or metal alloys including, for example, cobalt, nickel, copper, iron, cobalt-based alloys, nickel-based alloys, copper-based alloys, iron-based alloys, or the like deposited on at least a portion of core substrate 16. In some examples, nano-crystalline coating 18 may include a nickel-cobalt alloy, such as a nickel-cobalt superalloy, e.g., a Ni/Co layer. In some examples, nano-crystalline coating 18 may include cobalt and phosphorus, e.g., a Co/P layer.

In some examples, nano-crystalline coating 18 may include a plurality of layers. For example, nano-crystalline coating 18 may include at least one Ni/Co layer and at least one Co/P layer. The thickness of each layer of the plurality of layers may be the same or different. For example, nano-crystalline coating 18 may include a Ni/Co layer having a thickness of about 0.075 mm (e.g., about 0.003 inches) to about 1 mm (e.g., about 0.04 inches), such as about 0.381 mm (e.g., about 0.015 inches), and a Co/P layer having a thickness of about 0.025 mm (e.g., about 0.001 inches) to about 0.33 mm (e.g., about 0.013 inches), such as about 0.127 mm (e.g., about 0.005 inches).

Nano-crystalline coating 18 may be formed using suitable plating techniques, such as electro-deposition. For example, core substrate 16 may be suspended in suitable electrolyte solution that includes the selected metal or metal alloy for nano-crystalline coating 18. A pulsed or direct current (DC) may then be applied to core substrate 16 to plate the substrate with the fine-grained metal to form nano-crystalline coating 18 to a desired thickness and average grain size. In some examples, a pulsed current may be utilized to obtaining an average grain size less than about 20 nm.

In some such examples, core substrate 16 may be initially metalized in select locations with a base layer of metal to facilitate the deposition process of forming nano-crystalline coating 18 on core substrate 16 using electro-deposition. In some examples, the metalized base layer on core substrate 16 may be produced using, for example, electroless deposition, physical vapor deposition (PVD), chemical vapor deposition (CVD), cold spraying, gas condensation, and the like. The layer formed using metallization may include one or more of the metals used to form nano-crystalline coating 18.

In some examples, nano-crystalline coating 18 may be configured to exhibit improved barrier protection against erosion or corrosion compared to traditional materials used for mechanical system components, such as aerospace components. For example, nano-crystalline coating 18 may include a layer of nano-crystalline cobalt. The layer of nano-crystalline cobalt may impart anti-corrosion properties to component 10 as well as increased friction resistance and wear resistance to nano-crystalline coating 18 compared to traditional materials used for mechanical system components.

Additionally, or alternatively, nano-crystalline coating 18 may be configured to contribute to the durability of component 10 to resist compression stress and/or bending stress. For example, to improve compression stress resistance and/or bending stress resistance, mechanical system components have traditionally been formed with high strength metals, case hardened, carburized, and/or nitrided. Such techniques, however, may suffer from increased costs associated with processing and raw materials. Additionally, components formed from high strength metals may result in relatively dense and heavy components which may be less desirable in some applications, such as aerospace applications. Forming component 10 to include core substrate 16 and nano-crystalline coating 18 (e.g., nano-crystalline nickel) may significantly reduce the weight of the component compared to those formed with traditional high strength metals while also obtaining comparable or even improved compression stress resistance and/or bending stress resistance characteristics. Additionally, or alternatively, portions of component 10 may have improved micro-shear, micro-abrasion resistance, and/or micro-fretting resistance, such as, for example, spline teeth 23.

In some examples, the thickness 18 of nano-crystalline coating 18 may be between about 0.025 mm and about 0.15 mm. In some examples, nano-crystalline coating 18 may be about 0.13 mm (e.g., about 0.005 inches). In some examples, the overall thickness of nano-crystalline coating 18 may be selectively varied on different portions of core substrate 16 to withstand various mechanical loads that component 10 may be subjected to during operation. For example, in areas where increased compression stress resistance is desired, e.g., the face or the flank of teeth, the relative thickness of nano-crystalline coating 18 may be increased to impart greater strength properties in that region. Similarly, in areas where increased bending stress resistance is desired, e.g., the root fillet of teeth, the relative thickness of nano-crystalline coating 18 may be increased to impart greater strength properties in that region. Additionally, or alternatively, thickness 18 of nano-crystalline coating 18 in regions where mechanical stress resistance is less desired, the thickness of the coating may be reduced or removed from component 10, such as, for example, portions of outer rim 20, web 24 (e.g., trusses 30), or inner rim 26. In some examples, the relative thickness of nano-crystalline coating 18 may vary over a portion of component 10. For example, the relative thickness of nano-crystalline coating 18 may be thicker where trusses 30 meet outer rim 20 and/or inner rim 26 relative to other portions of trusses 30.

As shown in FIG. 1A, in some examples, component 10 may be in the form of a mechanical system component such as a spur gear. However, component 10 may include any number of mechanical system components that may benefit from the described strength characteristic, reduced weight, or vibrational damping features. Other mechanical system components may include, for example, aerospace components, housings, brackets, air ducts, manifolds, tubes, chevron ventilation outlets, vane box plume tabs, variable vane actuator arms, nose cones, transition duct seals, actuation rings, airfoils, flaps, casing, frames, accessory gear, drive shafts, rotors, discs, panels, tanks, covers, flow surfaces, turbine engine components, and the like. In some examples, component 10 may exhibit complex three-dimensional geometries. In other examples, component 10 may be in the form of a sheet or a shaped-sheet component.

Figure 2:
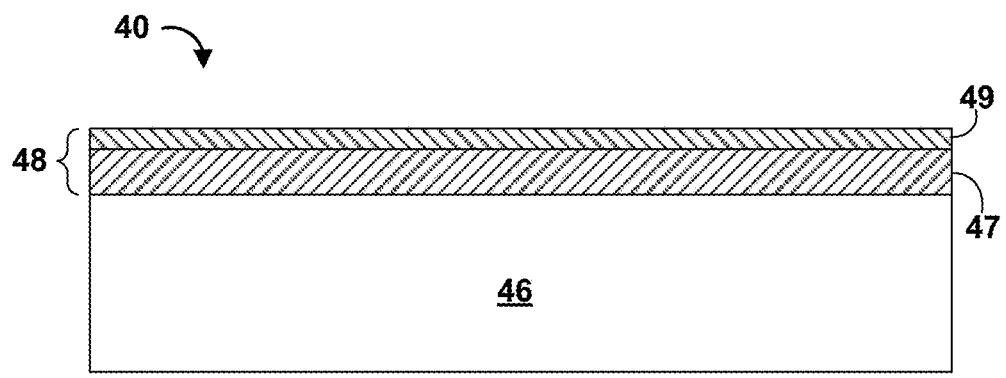
FIG. 2 is a conceptual partial cross-sectional view of an example component including core substrate and plurality of nano-crystalline layers.

In some examples, nano-crystalline coating 18 may include a plurality of nano-crystalline layers. FIG. 2 is a conceptual cross-sectional view of an example component 40 including core substrate 46 (e.g., similar to core substrate 16 as described above) and a nano-crystalline coating 48 that includes a first nano-crystalline layer 47 and a second nano-crystalline layer 49. Component 40 may be the same as or substantially similar to component 10 describe above in reference to FIGS. 1A and 1B, except for the differences described herein. For example, component 40 may include a resonance damping cavity.

In some examples, first and second nano-crystalline layers 47 and 49 may be selectively tailored to produce a nano-crystalline coating 48 with desired physical, thermal, and chemical (e.g., corrosion resistance) characteristics. For example, first nano-crystalline layer 47 may include nano-crystalline nickel or nickel-based alloy which may impart high tensile strength properties to nano-crystalline coating 48 to contribute to the overall durability of component 40. In some examples, first nano-crystalline layer 47 may include a nano-crystalline nickel-cobalt alloy. Second nano-crystalline layer 49 may include nano-crystalline cobalt or a cobalt-based alloy, which may impart anti-corrosion properties to nano-crystalline coating 48 as well as friction resistance and wear resistance. In some examples, second nano-crystalline layer 49 may include a nano-crystalline cobalt-phosphorus alloy.

In some examples, the relative thicknesses of first and metallic second nano-crystalline layers 47 and 49 may be substantially the same (e.g., the same or nearly the same within common nano-crystalline coating application tolerances) or may be different depending on the composition of the respective layer and intended application of component 40. In some examples in which first nano-crystalline layer 47 includes nickel or a nickel-based alloy and second nano-crystalline layer 49 includes cobalt or a cobalt-based alloy, the relative thicknesses of the layers may be selected such that first nano-crystalline layer 47 is about three times thicker than second nano-crystalline layer 49 (e.g., producing a thickness ratio of about 3:1 nickel-based layer to cobalt-based layer). For example, first nano-crystalline layer 47 (which may include nickel or a nickel-based alloy) may have a thickness of about 0.075 mm (e.g., about 0.003 inches) to about 1 mm (about 0.04 inches), such as about 0.381 mm (e.g., about 0.015 inches), and second nano-crystalline layer 49 (which may include cobalt or a cobalt-based alloy) may have a thickness of about 0.025 mm (e.g., about 0.001 inches) to about 0.33 mm (e.g., about 0.013 inches), such as about 0.127 mm (e.g., about 0.005 inches).

Figure 3:
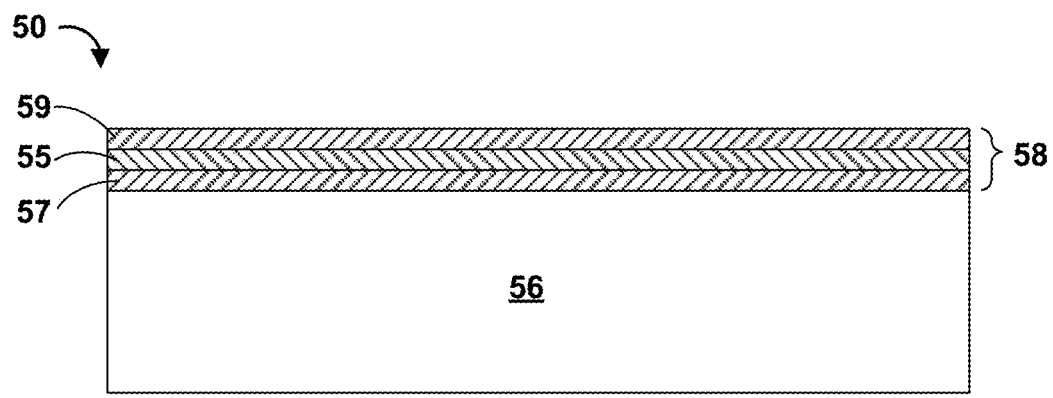
FIG. 3 is a conceptual partial cross-sectional view of an example component that includes a metal-polymer laminate on a portion of a core substrate.

Additionally, or alternatively, a component may be constructed with a multi-layered metal-polymer laminate structure. FIG. 3 is a conceptual cross-sectional view of an example component 50 including core substrate 56 (e.g., similar to core substrate 16 as described above) and a metal-polymer laminate 58 on a portion of core substrate 56. Component 50 may be the same as or substantially similar to components 10 and 40 discussed above in reference to FIGS. 1A-2, except for the differences described herein. For example, component 50 may include a resonance damping cavity.

Metal-polymer laminate 58 may include one or more polymer-based layers 55 and one or more nano-crystalline layers (e.g., first nano-crystalline layer 57 and second nano-crystalline layer 59) applied on core substrate 56 in an alternating fashion such that the outermost layer (e.g., layer 59) includes a nano-crystalline layer. In some examples, the alternating configuration of the one or more nano-crystalline layers 57 and 59 with one or more polymer-based layers 55 may impart additional vibrational-damping properties to component 50 by allowing for additional relative motion between one or more of the adjacent layers (e.g., between polymer-based layer 34 and first nano-crystalline layer 57, between polymer-based layer 34 and second nano-crystalline layer 59, or both).

In some examples, first nano-crystalline layer 57 and/or second nano-crystalline layer 59 may include the substantially the same (e.g., the same or nearly the same) composition of metals. In other examples, first nano-crystalline layer 57 and/or second nano-crystalline layer 59 may include different compositions of metals to impart different characteristics to component 50. For example, second nano-crystalline layers 59 may include nano-crystalline cobalt or cobalt-based alloy, which may impart anti-corrosion properties to metal-polymer laminate 58 as well as contribute friction resistance and wear resistance to the laminate structure, and first nano-crystalline layers 57 may include nano-crystalline nickel or nickel-based alloy, which may impart high tensile strength properties to the laminate structure to improve the overall durability of component 50. In some examples, the thicknesses of first and second nano-crystalline layers 57 and 59 may be between about 0.025 mm (e.g., about 0.001 inches) to about 1 mm (e.g., about 0.04 inches). The thickness selected for a respective layer may depend on a variety of factors including, for example, the composition of the respective layer, the purpose of the respective layer, and the total number of layers in metal-polymer laminate 58. In some examples, metal-polymer laminate 58 may define an overall thickness of about 0.075 mm to about 2.15 mm.

The one or more polymer-based layers 55 may be formed using any suitable polymeric material. In some examples, one or more of polymer-based layers 55 may include substantially the same (e.g., the same or nearly the same) polymeric material or include a composition substantially the same (e.g., the same or nearly the same) as core substrate 56. Each respective layer of polymer-based layers 55 may be formed using any suitable technique including, for example, injection molding, dip coating, and the like. The thickness of each respective layer of polymer-based layers 55 may be between about 0.025 mm and about 0.15 mm.

Figure 4:
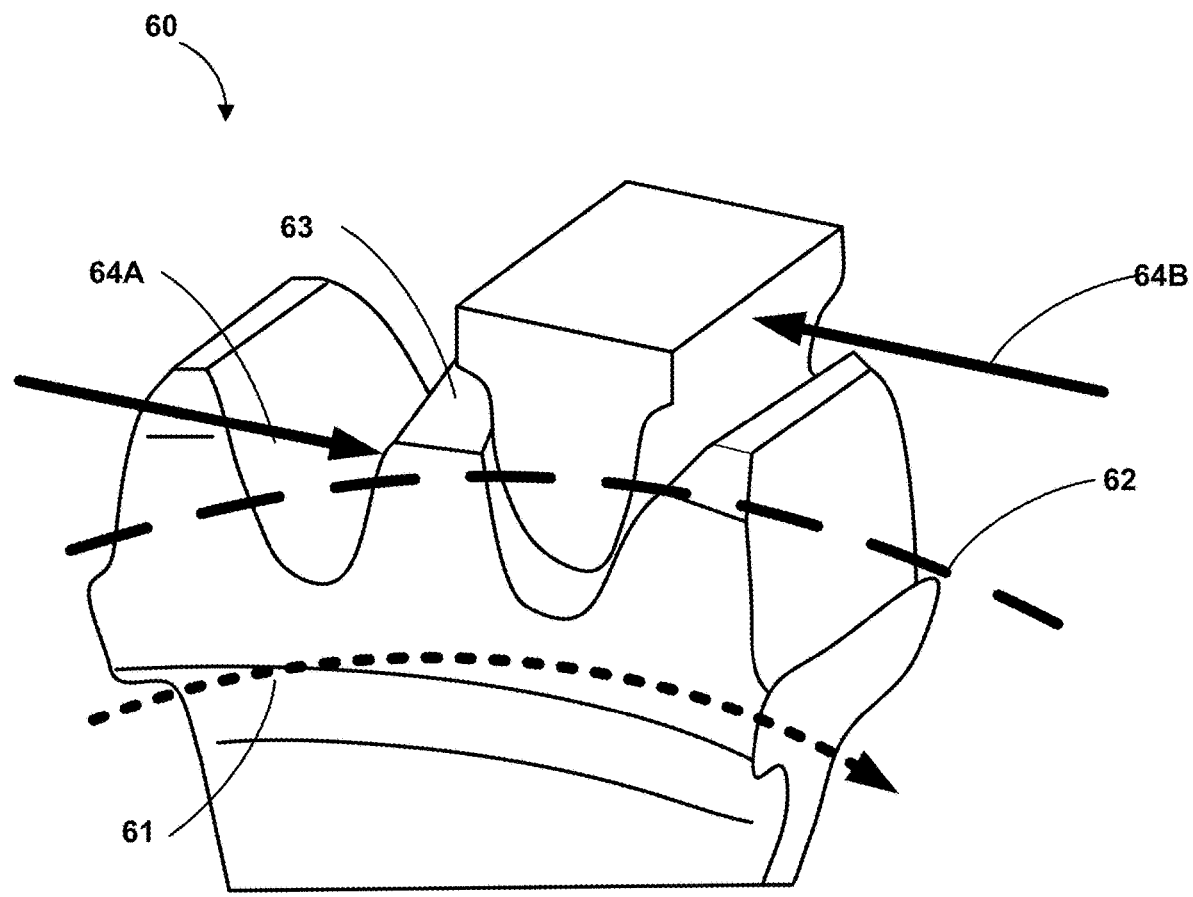
FIG. 4 is a conceptual diagram illustrating a portion of a spur gear under an applied load.

FIG. 4 is a conceptual diagram illustrating a portion of an example spur gear 60 under an applied load. The direction of rotation of spur gear 60 is illustrated as arrow 61. The pitchline is illustrated as dashed line 62. Force on tooth 63 is illustrated as opposing force arrows 64A and 64B.

Spur gear 60 included a core substrate (e.g., the same as or similar to core substrate 12) formed from a titanium-aluminum alloy (e.g., $\alpha_2Ti_3Al$ or equivalent). Spur gear 60 also included a nano-crystalline coating including two layers (e.g., the same as or similar to nano-crystalline coating 48). A first layer included a nickel-cobalt alloy intermediate shell encasing the core substrate. The first layer had a thickness of several thousandths of an inch (e.g., 15 mil). A second layer included a cobalt-phosphorus alloy outer shell (e.g., encasing the first layer. The second layer had a thickness of a few thousandths of an inch (e.g., 5 mil).

Figure 5A:
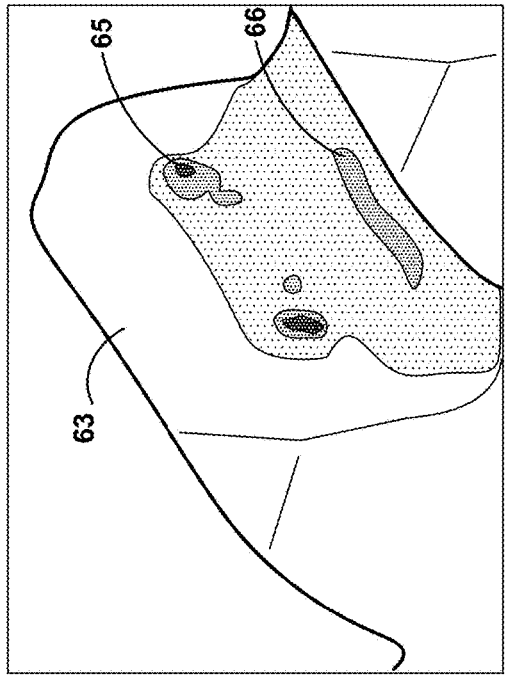
FIGS. 5A-5C are heat maps illustrating stresses applied to a coating top layer, a coating intermediate layer, and a core substrate of the spur gear of FIG. 4.
Figure 5B:
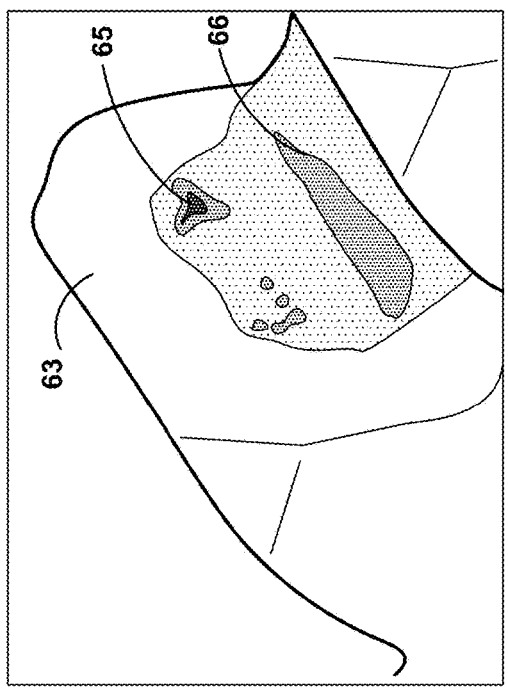
Figure 5C:
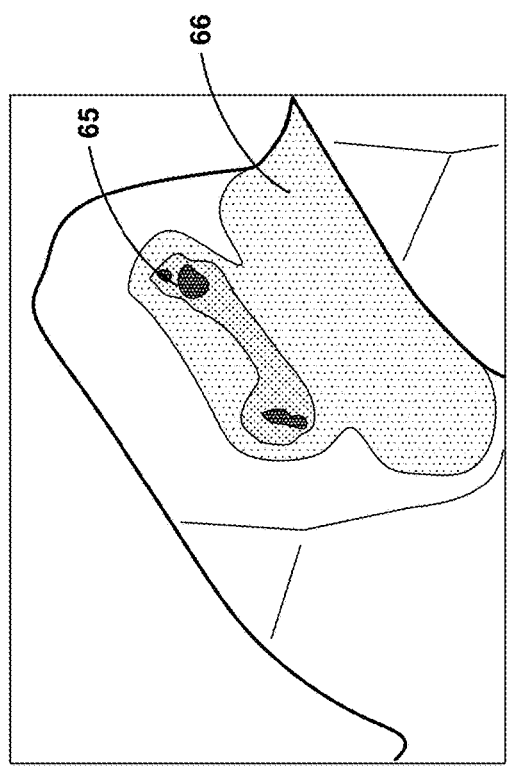

A uniform pitchline loading model was used to evaluate compressive stress and bending stress on spur gear 60. FIGS. 5A-5C are heat maps illustrating stresses applied in the uniform pitchline loading model to a coating top layer of gear 60 (FIG. 5A), a coating intermediate layer of gear 60 (FIG. 5B), and a core substrate of gear 60 (FIG. 5C). The maximum compressive stress on tooth 63 was located on face 65 at pitchline 62. The maximum bending stress of tooth 63 was located at root fillet 66.

Figure 6:
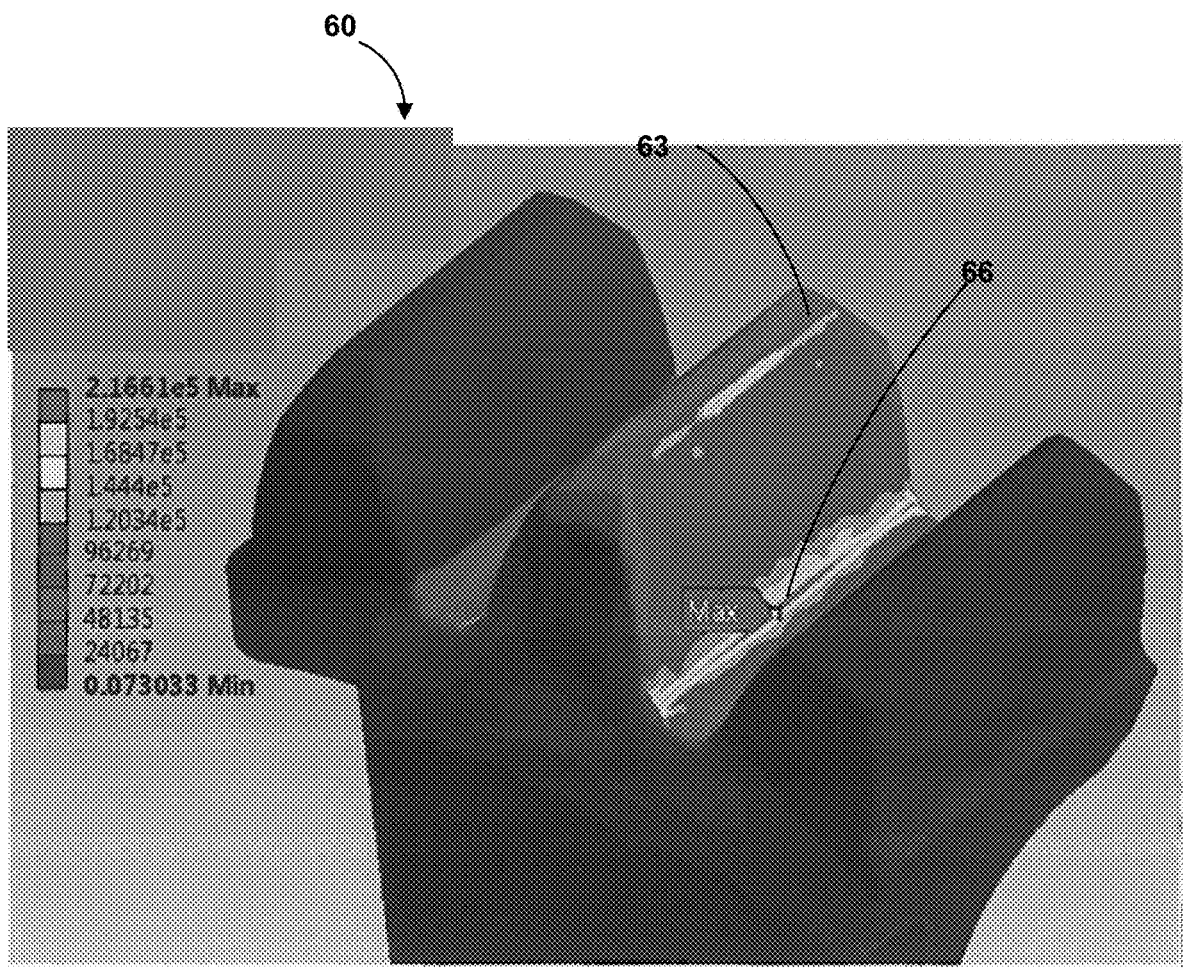
FIG. 6 is a heat map illustrating static structural equivalent stress applied to the spur gear pf FIG. 4 under an applied load.

FIG. 6 is a heat map illustrating static structural equivalent stress applied to gear 60 under an applied load using ANSYS 30 Finite Element Analysis. A maximum stress of about $2.1661 \times 105$ is located near the root fillet 66. The results illustrate that spur gear 60 was equivalent in bending stress and compression stress to a standard AMS6265 case carburized spur gear. However, spur gear 60 was lighter and cost less to produce based on cost index.

Figure 7:
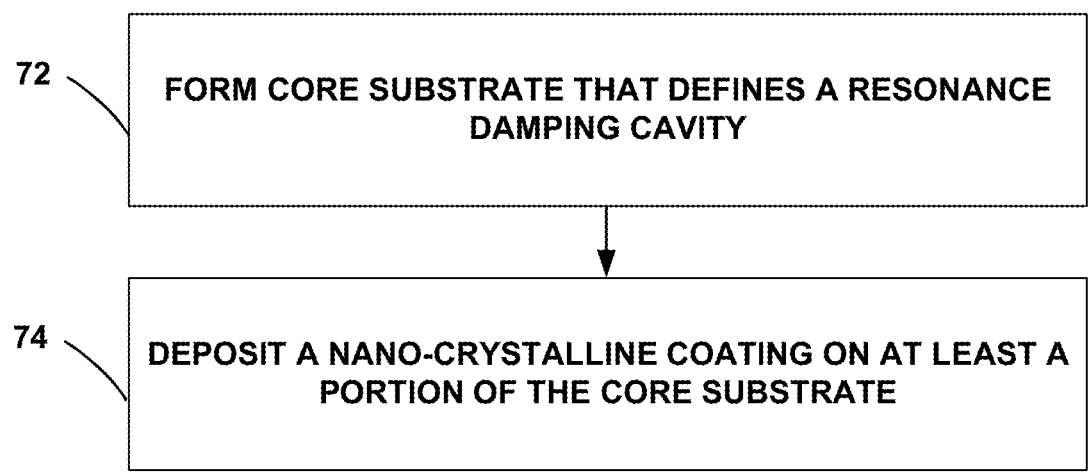
FIG. 7 is a flow diagram illustrating an example technique for forming an example component that includes a nano-crystalline coating on a core substrate that defines a resonance damping cavity.

FIG. 7 is a flow diagram illustrating an example technique for forming an example component that includes a nano-crystalline coating on a core substrate that defines a resonance damping cavity. While the techniques of FIG. 7 are described with concurrent reference to the conceptual diagrams of FIGS. 1-6, in other examples, the techniques of FIG. 7 may be used to form other components and aerospace components, the components and components of FIGS. 1-6 may be formed using a technique different than that described in FIG. 7, or both.

The technique of FIG. 7 includes forming core substrate 16 that defines a resonance damping cavity 12 (72). As described above, core substrate 16 may include a polymeric material, a metal, or an alloy. In some examples, forming core substrate 16 (72) may include additive manufacturing of core substrate 16, such as three-dimensional printing core substrate 16. In some examples, forming core substrate 16 (72) may include three-dimensional printing the core substrate in the shape of a gear. In some examples, forming core substrate 16 (72) may include introducing a vibration damping material into the resonance damping cavity. As discussed above, the vibration damping material may include a polymer, a metal, or an alloy.

The technique of FIG. 7 also includes depositing a nano-crystalline coating 18 on at least a portion of the core substrate 16 (74). As described above, nano-crystalline coating 18 may include one or more layers of nano-crystalline metal (e.g., nickel, cobalt, copper, iron, or the like) or metal alloy (e.g., nickel-based alloy, cobalt-based alloy, copper-based alloy, iron-based alloy, or the like) that defines an ultra-fine-grained microstructure with an average grain size less than about 20 nanometers (nm). The nano-crystalline coating 18 may be applied using an electro-deposition process (e.g., pulse electro-deposition using an electrolyte bath). In some examples, core substrate 16 may be initially metalized to aid in the deposition of nano-crystalline coating 18.

In examples in which nano-crystalline coating 18 includes a plurality of nano-crystalline coatings (e.g., layers 47 and 49), depositing nano-crystalline coating 18 (74) may include first layer 47 and depositing second layer 49. In some examples, first layer 47 may include a nano-crystalline nickel-cobalt alloy and define a first thickness. Second layer 49 may include a nano-crystalline cobalt-phosphorus alloy and define a second thickness. In some examples, the first thickness may be greater than the second thickness.

Additionally, or alternatively, the nano-crystalline coating may be deposited (74) as a metal-polymer laminate 58 that includes alternating layers of one or more nano-crystalline layers 57 and 59 with one or more polymer-based layers 55. In some such examples, the nano-crystalline layers 57 and 59 and polymer-based layers 55 may be selectively applied to allow for improved strength, wear and corrosion resistance, and additional relative motion between adjacent layers for increased vibrational-damping properties.

Various examples have been described. These and other examples are within the scope of the following claims.

What is claimed is:

1. A mechanical component comprising:
a core substrate comprising a polymeric material formed in the shape of a gear, wherein the gear comprises a body and gear teeth extending from the body, wherein the body defines a web structure comprising a plurality of truss supports and defines a resonance damping cavity, wherein the resonance damping cavity is an annular hollow chamber surrounding an inner rim and is disposed between the web structure and the gear teeth, wherein the resonance damping cavity is configured to damp a vibration in the component at a selected frequency or range of frequencies; and
a nano-crystalline coating on at least a portion of the gear teeth.

2. The mechanical component of claim 1, wherein a portion of the body adjacent the gear teeth defines the resonance damping cavity.

3. The mechanical component of claim 1, wherein the resonance damping cavity is at least partially filled with a vibration damping material, wherein the vibration damping material is different than a material of the core substrate.

4. The mechanical component of claim 1, wherein the vibration damping material comprises at least one of a polymer, rubber, polyurethane, polyvinyl chloride, or a metal or alloy.

5. The mechanical component of claim 1, wherein the polymeric material comprises at least one of polyether ether ketone (PEEK), polyamide (PA), polyimide (PI), bis-maleimide (BMI), epoxy, phenolic polymers, polyesters, polyurethanes, silicone rubbers, nylons, or combinations thereof.

6. The mechanical component of claim 1, wherein the core substrate has not undergone a case hardening process, a carburizing process, or a nitriding process.

7. The mechanical component of claim 1, wherein the nano-crystalline coating comprises at least one of cobalt, nickel, or alloys thereof.

8. The mechanical component of claim 1, wherein the nano-crystalline coating comprises cobalt and phosphorus.

9. The mechanical component of claim 1, wherein the nano-crystalline coating substantially encases the core substrate.

10. The mechanical component of claim 1, wherein the nano-crystalline coating comprises a plurality of nano-crystalline coatings deposited on the substrate, and wherein at least one of the nano-crystalline coatings substantially encases the substrate.

11. The mechanical component of claim 10, wherein the plurality of nano-crystalline coatings comprises:
a first layer comprising nano-crystalline nickel-cobalt alloy defining a first thickness; and
a second layer comprising nano-crystalline cobalt-phosphorus alloy defining a second thickness, wherein the first thickness is greater than the second thickness.

12. The mechanical component of claim 1, wherein the selected frequency or range of frequencies is from about 500 Hz to about 5,000 Hz.

13. A gear comprising:
a core substrate comprising a polymeric material formed in the shape of the gear, wherein the gear comprises a body and gear teeth extending from the body, wherein the body defines a web structure comprising a plurality of truss supports, and wherein a portion of the body adjacent the gear teeth defines a resonance damping cavity, wherein the resonance damping cavity is an annular hollow chamber surrounding an inner rim and is disposed between the web structure and the gear teeth, wherein the resonance damping cavity configured to damp a vibration in the gear at a selected frequency or range of frequencies; and
a nano-crystalline coating on at least a portion of the gear teeth.

14. A method for forming an aerospace mechanical component comprising:

forming a core substrate comprising a polymeric material formed in the shape of a gear, wherein the gear comprises a body and gear teeth extending from the body, wherein the body defines a web structure comprising a plurality of truss supports and defines a resonance damping cavity, wherein the resonance damping cavity is an annular hollow chamber surrounding an inner rim and is disposed between the web structure and the gear teeth, wherein the resonance damping cavity is configured to damp a vibration in the component at a selected frequency or range of frequencies; and depositing a nano-crystalline coating on at least a portion of the gear teeth.

15. The method of claim 14, wherein forming a core substrate comprises three-dimensional printing the core substrate.

16. The method of claim 14, wherein forming a core substrate comprises introducing a vibration damping material into the resonance damping cavity.

17. The method of claim 14, wherein the nano-crystalline coating comprises a plurality of nano-crystalline coatings, wherein depositing the nano-crystalline coating comprises:

depositing a first layer comprising nano-crystalline nickel-cobalt alloy defining a first thickness; and depositing a second layer comprising nano-crystalline cobalt-phosphorus alloy defining a second thickness, wherein the first thickness is greater than the second thickness.

\* \* \* \* \*